United States Patent
Lang et al.

(10) Patent No.: US 6,777,824 B2
(45) Date of Patent: Aug. 17, 2004

(54) ELECTRONIC MIRROR CIRCUIT AND OUTSIDE MIRROR ASSEMBLY WITH SUCH A CIRCUIT

(75) Inventors: Heinrich Lang, Ergersheim (DE); Michael Witzke, Ansbach (DE)

(73) Assignee: Lang Mekra North America, LLC, Ridgeway, SC (US)

(*) Notice: Subject to any disclaimer, the term of this patent is extended or adjusted under 35 U.S.C. 154(b) by 299 days.

(21) Appl. No.: 09/760,607

(22) Filed: Jan. 16, 2001

(65) Prior Publication Data

US 2002/0048102 A1 Apr. 25, 2002

(30) Foreign Application Priority Data

Oct. 19, 2000 (DE) .......................... 100 51 895

(51) Int. Cl.[7] .................................. B60L 7/00
(52) U.S. Cl. .............................. 307/10.1; 307/125
(58) Field of Search .............................. 307/125, 10.1; 701/49; 659/872–877

(56) References Cited

U.S. PATENT DOCUMENTS

| | | |
|---|---|---|
| 4,503,504 A | 3/1985 | Suzumura et al. |
| 4,504,117 A | 3/1985 | Mittelhäuser |
| 4,626,063 A | 12/1986 | Honey |
| 4,682,294 A | 7/1987 | Duc et al. |
| 4,698,464 A * | 10/1987 | Tanaka et al. ............. 200/5 R |
| 4,706,194 A | 11/1987 | Webb et al. |
| 4,942,571 A | 7/1990 | Moller et al. |
| 4,975,547 A * | 12/1990 | Nakayama et al. ......... 200/5 R |
| 5,796,176 A * | 8/1998 | Kramer et al. ............. 307/10.1 |
| 6,229,434 B1 * | 5/2001 | Knapp et al. ............. 340/310.01 |
| 6,465,904 B2 * | 10/2002 | O'Farrell et al. ............. 307/9.1 |
| 6,472,773 B2 * | 10/2002 | Kramer et al. ............. 307/10.1 |
| 6,515,378 B2 * | 2/2003 | Drummond et al. ....... 307/10.1 |

FOREIGN PATENT DOCUMENTS

| | | |
|---|---|---|
| DE | 3441337 A1 | 11/1984 |
| DE | 3913266 C2 | 4/1989 |
| DE | 36135562 C2 | 4/1989 |
| DE | 4128306 A1 | 3/1993 |

OTHER PUBLICATIONS

English Language Abstract of DE 4128306, Mar. 4, 1993.
DE 3441337, Derwent, Dialogue Abstract (c) 2002.
DE 3913266, Derwent, Dialogue Abstract (c) 2002.
DE 3613556, Derwent, Dialogue Abstract (c) 2002.
Germany Search Report, May 21, 2002.
European Search Report, EP 01 12 4880 Jul. 25, 2002.

* cited by examiner

Primary Examiner—Gregory J. Toatley, Jr.
(74) Attorney, Agent, or Firm—McNair Law Firm, P.A.

(57) ABSTRACT

An electronic mirror circuit for the activation of mirrors for motor vehicles, where the mirrors are positioned adjusted by electric motors. The circuit is made of an operational component having a plurality of circuits for conducting currents. Also, a load control unit is correspondingly connected with the current conducting circuits. A plurality of load circuits are in communication with the load control unit. Each of the load circuits corresponds with a given one of the current conducting circuits. The load circuits are activated by the current conducting circuits. Also provided is an electrical coupling device for connecting the load circuits to the mirrors via a wire distribution tree.

18 Claims, 2 Drawing Sheets

ELECTRONIC MIRROR CIRCUIT AND OUTSIDE MIRROR ASSEMBLY WITH SUCH A CIRCUIT

BACKGROUND

The invention concerns an electronic mirror circuit for the activation of outside mirrors, the adjustments of which are powered by electric motors. The mirrors are especially designed for motor vehicles, especially for commercial vehicles. The invention further concerns an outside mirror with such an electronic mirror circuit.

In motor vehicles, especially in commercial vehicles as well as in personal automobiles, more and more electrically activated elements are found. These elements include, for instance, central locking systems, power windows, adjustable outer mirrors, sun roof components, and the like. DE 41 28 306 A1 discloses an operational apparatus for peripheral devices and positional drives, especially for the activation and the positional displacement of outside rearview mirrors. For the individual functions and positional drives in the mirrors, switches or sensor keys are provided in the operational apparatus. Upon the activation of the respective sensor keys in a sending unit, corresponding digital control signals are produced which are conducted by means of a bus line to the respective mirror. At that point the control signals are again converted into corresponding analog signals, by means of which, the respective functions or the respective positional drive in the corresponding mirror are activated. In this way, in and on a small and compact operational apparatus, a plurality of circuits can be encapsulated which are easily maintained since the individual circuits possess no mechanical parts. However, the disadvantage is that operational apparatuses of this kind can only be employed if the respective vehicle is equipped with a corresponding control bus system.

OBJECTIVES AND SUMMARY OF THE INVENTION

Therefore, it is the purpose of the present invention to make available an electronic mirror circuit which can be installed in vehicles with conventional wiring. Further, it is the purpose of the present invention to create an outside mirror for motor vehicles with such a mirror circuit.

The achievement of these purposes is accomplished by the features of the invention. Additional objects and advantages of the invention will be set forth in part in the following description, or may be learned through practice of the invention.

Because of the fact that a plurality of circuits handling current low in both voltage and amperage (hereafter referred to as low current) serve sensor keys or membrane keyboards and is connected with a multitude of load-switches, it is possible to place a great many circuits and operational elements in a relatively tightly compressed space. By means of a coupling device the individual load switches are connected with a conventional distribution wiring harness. By this means, it becomes possible to install the electronic mirror circuit in motor vehicles with conventional wiring without additional expense.

In accord with an advantageous embodiment of the invention, in the operational component an optical and/or acoustic display and/or alarm is provided which makes known the activation of a specific low current circuit. This is of particular advantage in the case of sensor keys or membrane keyboards, since otherwise the IN or OUT positions of the respective circuit are not recognizable.

In accord with a further advantageous embodiment of the invention, all components of the electronic mirror circuit are placed in a common housing whereby the operational component, i.e. the operational elements, are accessible from the front side, and the electronic coupling arrangement can be accessed from another side, preferably the rear side. In this way the installation is simplified in the invented electronic mirror circuit in a vehicle having conventional wiring.

In accord with a preferred embodiment of the invention, in the case of the electrical coupling apparatus, a standard plug-in device is available by means of which the conventional analog circuits can be connected to the electronic mirror circuit via the distribution wiring harness.

BRIEF DESCRIPTION OF THE DRAWINGS

The remaining features and advantages of the invention are made evident in the following description with the help of the drawings of an example embodiment. There is shown in.

DETAILED DESCRIPTION

Figure 1:
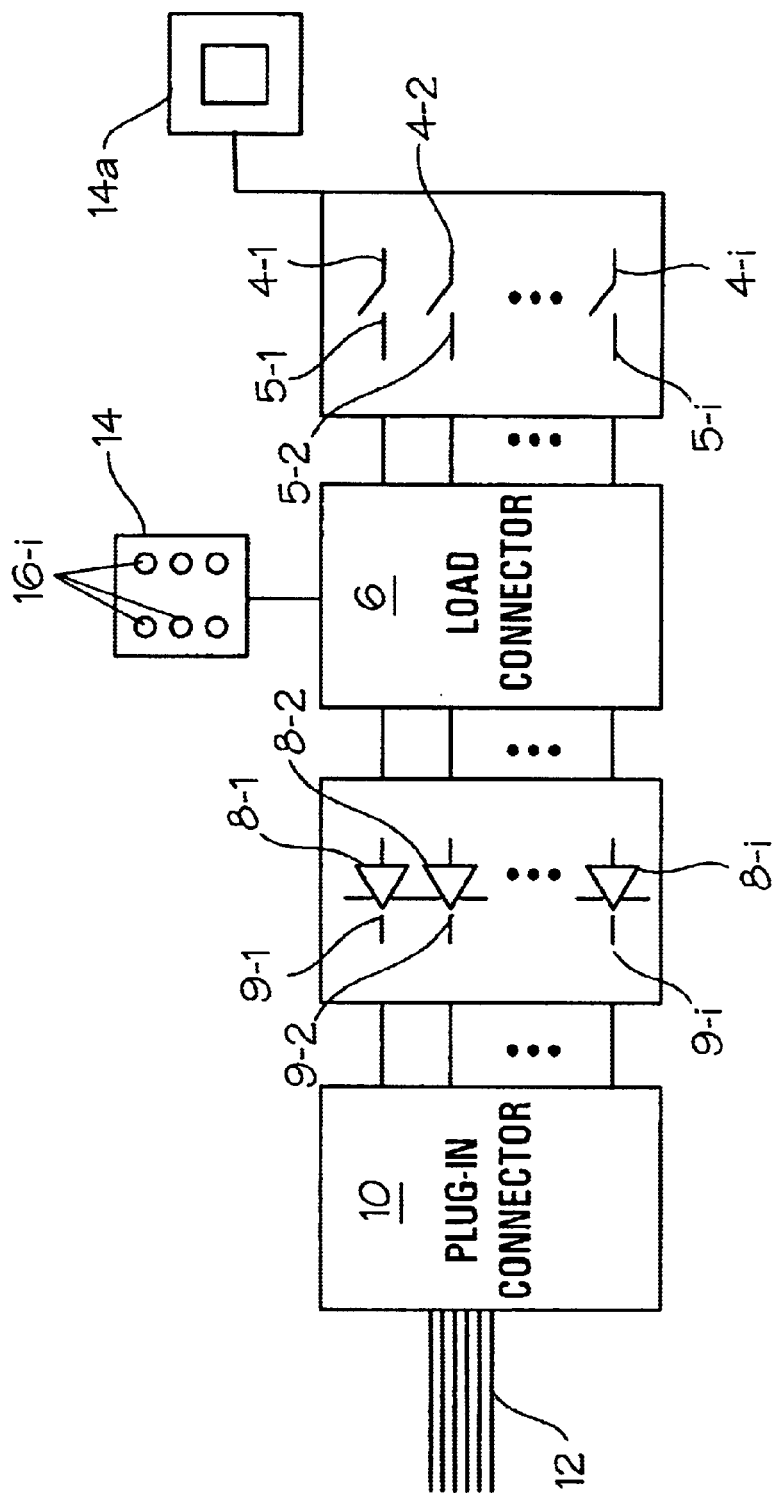
FIG. 1 a block circuit diagram of an example embodiment.

Reference will now be made to the presently preferred embodiment of the present invention, an example of which is illustrated in the drawings. The example is provided by way of explanation of the invention and is not meant as a limitation of the invention. For example, features illustrated or described as part of one embodiment can be used on another embodiment to yield yet a third embodiment. Accordingly, it is intended that the present invention include such modifications and variations.

FIG. 1 shows, as an example, an embodiment of the electronic circuit in accord with the present invention with an operational component 2 having a plurality of low current control circuits 5-1, 5-2 . . . , 5-i activated by low current control switches 4-1, 4-2, . . . , 4-i in the form of sensor or membrane keys. By means of a load control unit 6, the control switches 4-1, 4-2, . . . , 4-i are respectively associated with load switches 8-1, 8-2, . . . , 8-i connected in load current circuits 9-1, 9-2, . . . 9-i. The outputs of the load circuits are connected to their respective motor devices in the mirror by means of an electrical coupling device in the form of a standard plug-in connector 10 which is in communication with electrical lines in a wire-distribution harness 12. By means of a display device 14, which comprises a plurality of LEDs 16-1, 16-2, . . . , 16-i, the activation of individual circuits and their operational condition is optically displayed.

In addition, the activation of individual control switches 4-1, 4-2, . . . , 4-i can also be announced by an acoustic signal device 14a. The current supply of the electronic mirror circuit is the same as the current supply of the respective motor vehicle.

Figure 2:
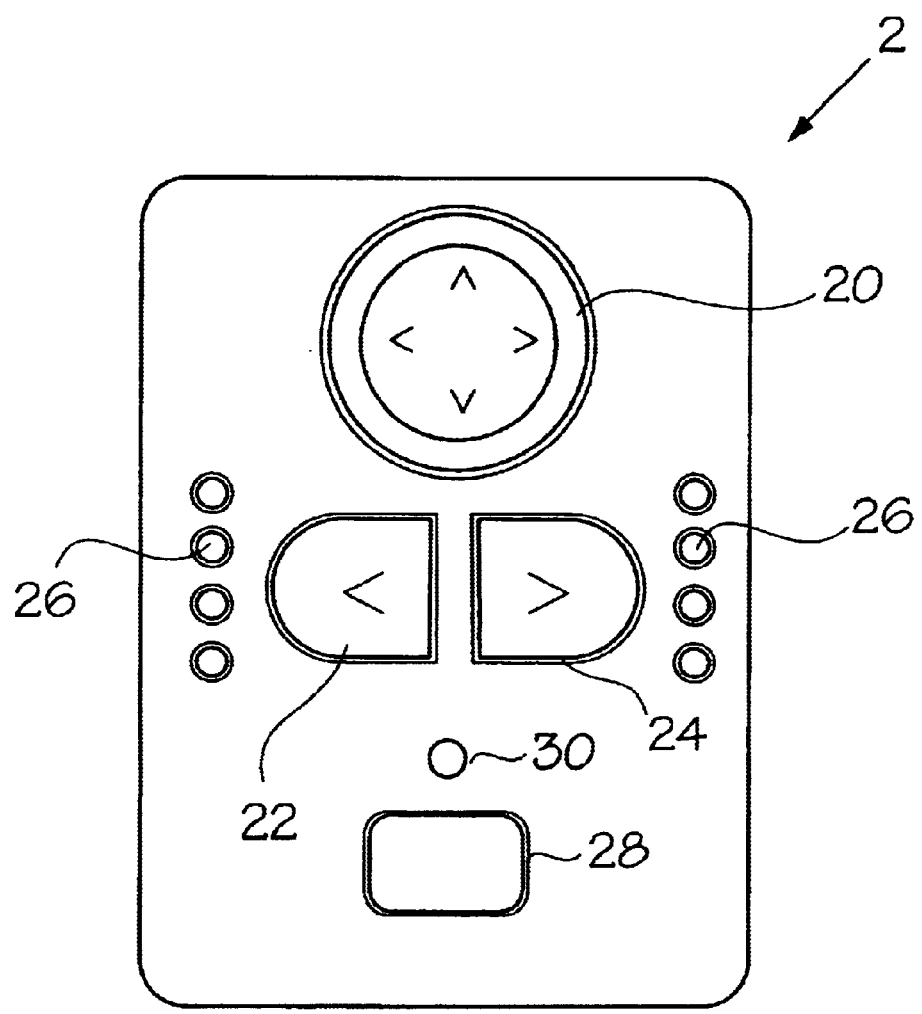
FIG. 2 the front view of the operational component of FIG. 1.

FIG. 2 shows, in a plan view, an embodiment in which a plurality of low current control circuits switches 4-1, 4-2, . . . , 4-i is made available for various functions. Keys on the operational component 2 allow for the low current circuits to be activated. A One of the low current circuits, controlled by a toggle switch 20, serves for the positioning and tilting of the respective outside mirror in one plane. Further, two mirror-choice buttons, button 22 for the left mirror on the driver's side, and button 24 for the right mirror on the passenger side, are provided. By means of these choice buttons, either the left or the right mirror is subject to adjustment. Besides the two mirror-choice buttons 22 and 24, are provided on the left and right sides,-respectively four LED elements 26. By means of these LED elements, which are a preferred embodiment of LED's 16–16i of FIG. 1. the positioning of the respective mirror is visibly displayed. Below the two mirror-choice buttons 22 and 24 Is placed a mirror heating switch 28 by which the mirror heating in the two outside mirrors can be activated. The keys on the operational component 2 can be membrane pressure keys.

Above the mirror heating switch 28 is placed a "Heating" LED element 30, which becomes illuminated when the mirror heating has been activated by means of the mirror heating switch 28.

The electronic mirror circuit can be used to drive an electric motor driven positioning unit 32 for the positioning of at least one mirror pane 34 in a rearview mirror housing 36. The operational component 2, the load control unit 6, and the plurality of load circuits 8-1 . . . 8-i may be placed in a common housing 38, with the operational unit on a front side and the electrical coupling device 10 on an outer side of the housing, so that the housing may be installed in an instrument panel or a door of a vehicle.

It should be appreciated by those skilled in the art that various modifications and variations can be made in the present invention without departing from the spirit and scope of the invention.

What is claimed is:

1. An electronic mirror control circuit for the positioning of mirrors on motor vehicles where the mirrors position is adjusted by electric mirror motors, the control circuit comprising:

an operational component including a plurality of low current control circuits having low current control switches for controlling current flow in said control circuits;

a plurality of load circuits for conducting load currents;

load switches connected in said load circuits for controlling load current flow in said load circuits to selectively deliver said load currents to said mirror motors;

a load control unit connected between said control circuits and said load circuits for associating preselected control circuits with preselected load switches so that load switches are activated by said associated control circuits and, an electrical coupling device for connecting the load circuits to the mirror motors so that said mirrors are positioned in response to actuation of said control switches.

2. An electronic mirror circuit as set forth in claim 1, wherein one of the low current control circuits serves for the activation of mirror heating.

3. An electronic mirror circuit as set forth in claim 1, further comprising a signaling device for the production of at least one of the following:

an optical signal; and, an acoustic signal, to designate the activation of a circuit.

4. An electronic mirror circuit as set forth in claim 1, wherein said operational component has sensor keys for selectively activating said control circuits.

5. An electronic mirror circuit as set forth in claim 1, wherein said operational component has keys that are membrane pressure keys for selectively activating said control circuits.

6. An electronic mirror circuit as set forth in claim 1, wherein said operational component said load control unit, and said plurality of the load circuits are placed in a common housing, and the operational component is located on a side of the common housing, and the electrical coupling device is provided on an opposite side of the common housing.

7. An electronic mirror circuit as set forth in claim 6, wherein the common housing is configured for installation in an instrument panel.

8. An electronic mirror circuit as set forth in claim 6, wherein the common housing is configured for installation in an instrument panel in a door of a motor vehicle.

9. An electronic mirror circuit as set forth in claim 1, wherein the electric coupling device is of standard plug-in construction.

10. An electronic mirror circuit as set forth in claim 3, wherein the signaling device includes a plurality of light emitting diodes.

11. An electronic mirror circuit as set forth in claim 1, further comprising:

an electric motor driven positioning unit communicating with the wire distribution harness; and at least one mirror pane being positioned by the electric motor driven positioning unit.

12. An electronic mirror circuit for activating a mirror positioning motor comprising:

an operational component having a low current control circuit and a key for selectively activating the control circuit;

a load control unit having a load current circuit for delivering a load current to said mirror positioning motor connected to said control circuit;

a load circuit switch connected to said load current circuit activated by said key; and, an electrical coupling device for connecting the load circuit to the mirror positioning motor.

13. An electronic mirror circuit as set forth in claim 12, further comprising a signaling device connected to the operational component for indicating the activation of said control circuit.

14. An electronic mirror circuit as set forth in claim 12, wherein the key is a membrane pressure key.

15. An electronic mirror circuit as set forth in claim 12, wherein the Operational component, the load control unit, and the load circuit switch are in a common housing and the operation control unit is on a side of the common housing, and the electrical coupling device is in an outer side of the common housing.

16. An electronic mirror circuit as set forth in claim 15, wherein the common housing is configured for placement in at least one of an instrument panel and in a door of a motor vehicle.

17. An electronic mirror circuit as set forth in claim 12, wherein the electric coupling device is of standard plug-in construction.

18. An electronic mirror circuit as set forth in claim 13, wherein the signaling device has a plurality of light emitting diodes.

* * * * *